United States Patent
Deng

(10) Patent No.: US 12,510,683 B2
(45) Date of Patent: Dec. 30, 2025

(54) METAL DETECTOR

(71) Applicant: Maoquan Deng, Shenzhen (CN)

(72) Inventor: Maoquan Deng, Shenzhen (CN)

(*) Notice: Subject to any disclaimer, the term of this patent is extended or adjusted under 35 U.S.C. 154(b) by 151 days.

(21) Appl. No.: 18/487,133

(22) Filed: Oct. 16, 2023

(65) Prior Publication Data

US 2025/0067895 A1 Feb. 27, 2025

(30) Foreign Application Priority Data

Aug. 21, 2023 (CN) .......................... 202322252137.3

(51) Int. Cl.
*G01V 3/10* (2006.01)
*G01V 3/17* (2006.01)

(52) U.S. Cl.
CPC . *G01V 3/10* (2013.01); *G01V 3/17* (2013.01)

(58) Field of Classification Search
CPC .......... G01V 3/10; G01V 3/101; G01V 3/102; G01V 3/104; G01V 3/105; G01V 3/107; G01V 3/108; G01V 3/15; G01V 3/16; G01V 3/165; G01V 3/17
See application file for complete search history.

(56) References Cited

U.S. PATENT DOCUMENTS

2020/0333496 A1* 10/2020 Zheng ...................... G01V 3/15
2021/0116597 A1* 4/2021 Deng ...................... F16M 11/10

FOREIGN PATENT DOCUMENTS

CN 209746141 U * 12/2019

* cited by examiner

*Primary Examiner* — David M Schindler

(57) ABSTRACT

A metal detector includes a detection disc, a detection rod rotationally connected to the detection disc, a protective sleeve detachably connected within the detection rod, and electronic components housed within the protective sleeve. The electronic components include a main circuit board extending along the length of the protective sleeve and a secondary circuit board perpendicular to the main circuit board, positioned near the opening of the protective sleeve. On the side of the secondary circuit board facing the interior of the detection rod, there is a detection disc socket. The detection disc includes a coil, a waterproof cable connected to the coil, and a detection disc plug located at the end of the waterproof cable. The waterproof cable and detection disc plug extend into the detection rod, allowing the detection disc plug to be inserted into the detection disc socket.

9 Claims, 7 Drawing Sheets

METAL DETECTOR

TECHNICAL FIELD

The invention relates to the field of metal detection technology, specifically a metal detector.

BACKGROUND OF THE INVENTION

In the field of metal detection, metal detectors are commonly used detection tools, and according to their applications, metal detectors are mainly divided into: security metal detectors, treasure hunting detectors, and landmine detectors. Current metal detectors are designed with protection to prevent damage during use; some are also designed to be waterproof to ensure that the circuits are not damaged in rainy environments or during underwater detection. However, most metal detectors have their electronic components housed within the control box, and they connect the detection disc via external cables and rods. To meet diverse environmental requirements, handheld metal detectors need to be designed as compact, lightweight, and waterproof as possible.

The market already has treasure hunting and landmine detection metal detectors, mainly divided into two design methods. One design places the circuit board within a separate control box, connecting the metal detector's control box through external or rod-embedded spiral spring cables. This design has the following drawbacks: 1. The spring cable results in a relatively heavy overall weight; 2. The connected cable is prone to create antenna effects, leading to substantial EMI interference; 3. External cables are easily damaged by external forces. Another design embeds the circuit board within the detection disc, transmitting signals to the control box using wireless technology. This design has the following disadvantages: 1. When placing the electronic circuit between the detection coils, the detection coils will more tightly surround the electronic circuit, thereby causing stronger induced electromotive forces and induced currents, generating electromagnetic interference signals that disrupt the normal operation of the metal detector and affect the accuracy and stability of the signal; 2. Entering underwater can interrupt signals due to the inability of wireless transmission to communicate with the control box; 3. When the user needs to replace the detection disc with another size, the cost will also be high.

DESCRIPTION OF THE INVENTION

To solve the problems in the aforementioned background technology, the invention provides a metal detector that houses electronic components within the detection rod, allowing for the separate detachment and replacement of the detection disc.

A metal detector, comprising:
a detection disc;
a detection rod rotationally connected to the detection disc;
a protective sleeve detachably connected inside the detection rod; and
electronic components set within the protective sleeve; wherein:
The electronic components include a main circuit board extending along the length direction of the protective sleeve and a secondary circuit board perpendicular to the main circuit board, with the secondary circuit board located near the opening position of the protective sleeve;
The secondary circuit board has a detection disc socket facing the interior side of the detection rod;
The detection disc includes a coil, a waterproof cable connected to the coil, and a detection disc plug located at the end of the waterproof cable; The waterproof cable and the detection disc plug extend into the detection rod, allowing the detection disc plug to plug into the detection disc socket.

Furthermore, the electronic components are detachably connected inside the protective sleeve via an installation plate located at the opening end of the protective sleeve; the outer diameter of the upper part of the protective sleeve is adapted to the inner diameter of the detection rod.

Furthermore, the protective sleeve includes a main housing cavity and a positioning part located on the opening side of the main housing cavity, the main circuit board is located inside the main housing cavity, and the secondary circuit board abuts against the positioning part and is fixed between the positioning part and the installation plate by fasteners.

Furthermore, the protective sleeve also includes a waterproof mounting groove located below the detection disc socket, the detection disc plug connects the waterproof cable via a waterproof mounting part matching the inner diameter of the waterproof mounting groove; a waterproof sealing ring is provided between the waterproof mounting groove and the waterproof mounting part.

Furthermore, the opening end of the protective sleeve is also sealed with a waterproof cover, a first connection part is arranged at the opening end of the protective sleeve, and a second connection part is arranged on the waterproof cover, and the first connecting part and the second connecting part are hermetically connected through a waterproof ring.

Furthermore, the electronic components also include a battery electrically connected to the main circuit board, the side of the main circuit board away from the secondary circuit board is fixed a power socket, with the power socket penetrating the installation plate toward the outside.

Furthermore, the electronic components also include a display device and/or an alarm device electrically connected to the main circuit board.

Furthermore, the portion of the waterproof cable near the detection disc is a thickened cable; part of the thickened cable extends into the detection rod, and part of the thickened cable is located outside the detection rod.

Furthermore, the detection disc and detection rod are connected by fastening components and fixing components, and the detection disc is fixed a first bracket, with a first through hole on the first bracket, and the detection rod is fixed a second bracket with a second through hole corresponding to the first through hole, and the fastening components have a bolt, which passes through the second through hole and the first through hole in sequence and connects to the fixing components, and the detection rod rotating around the bolt as the axis of rotation, there is also a third through hole below the first through hole on the first bracket, and a fixed column is arranged on the fastening components and the fixed column passes through the third through hole.

Furthermore, the bolt has external threads, and the fixing components have internal threads, and the fixing components are screwed onto the bolt, fixing the relative positions of the detection disc and the detection rod.

The metal detector of the invention includes a protective sleeve within the detection rod, and electronic components within the protective sleeve, and the electronic components include a main circuit board and a secondary circuit board. A detection disc socket is provided on the side of the secondary circuit board facing the interior of the detection rod, and the waterproof cable extends into the detection rod, connecting through the detection disc plug to the detection disc socket. This design allows for the separate detachment and replacement of the detection disc, while also meeting the metal detector's waterproof design requirements through housing the electronic components within the protective sleeve. The overall structure is simple, lightweight, and compact.

During assembly of this metal detector, the waterproof cable and detection disc plug are inserted through the bottom of the detection rod, revealing the detection disc plug at the end of the detection rod. Then, part of the protective sleeve is inserted into the detection rod, and the detection disc plug is inserted into the detection disc socket. Finally, the entire protective sleeve is pushed into the detection rod, and its position is fixed by the mutual pressure fitting of the upper outer diameter of the protective sleeve and the inner diameter of the detection rod. When a different size detection disc is required, the protective sleeve is first pulled out, and the detection disc plug is removed. The new detection disc's waterproof cable is threaded through the bottom of the detection rod and connected to the detection disc socket on the protective sleeve, finally pushing the protective sleeve back into the detection rod. When charging is needed, the waterproof cover on the protective sleeve is removed, and the charging head is plugged in; once charging is complete, the waterproof cover is tightened again.

In the metal detector, the part of the waterproof cable near the detection disc is a thickened cable, partly extending into the detection rod and partly located outside the detection rod. This design prevents wear on the waterproof cable by the detection rod during rotation, and the thickened cable also serves to push the cable into the detection rod.

By providing a waterproof mounting groove on the protective sleeve, the metal detector creates waterproof conditions for the detection disc plug of the waterproof cable, preventing moisture from entering the protective sleeve through the detection disc plug.

BRIEF DESCRIPTION OF THE DRAWINGS

To further clarify the implementation of this utility model or the technical solutions in existing technology, a brief introduction to the drawings needed for describing the embodiments or existing technology follows. Obviously, the drawings described below represent only some embodiments of this utility model. For those skilled in the art, other drawings can be obtained without creative effort based on these drawings.

LIST OF REFERENCES AND FIGURES

Figure 1:
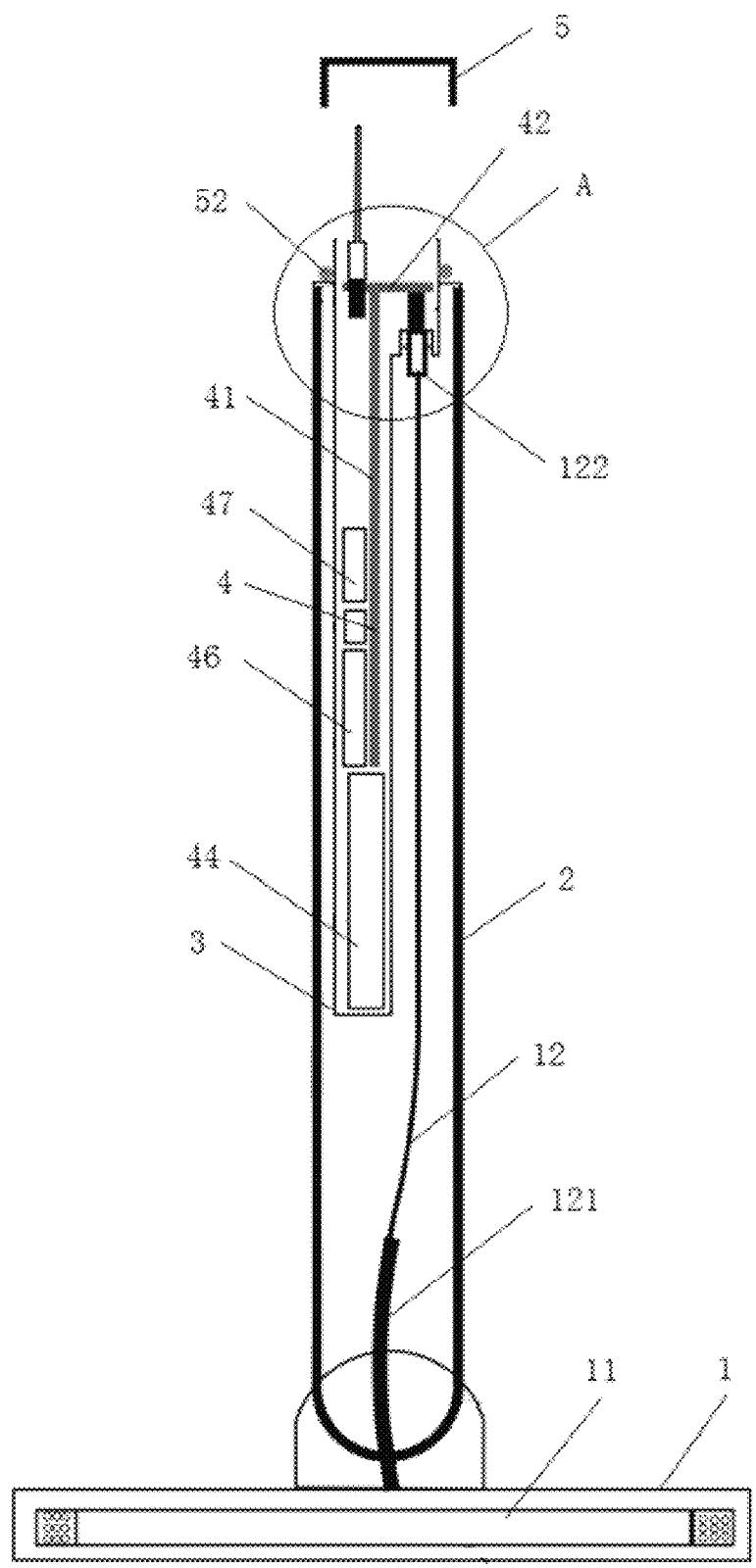
FIG. 1 shows a schematic diagram of the overall structure of the metal detector.

1—detection disc, 11—coil, 12—waterproof cable, 121—thickened cable, 122—waterproof mounting part, 13—detection disc plug, 14—first bracket, 141—first through-hole, 142—third through hole;

2—detection rod, 21—second bracket, 211—second through-hole,

3—protective sleeve, 31—main housing cavity, 32—positioning part, 33—mounting plate, 34—fastener, 35—waterproof mounting groove, 36—waterproof sealing ring, 37—first connecting part;

4—electronic components, 41—main circuit board, 42—secondary circuit board, 43—detection disc socket, 44—battery, 45—power socket, 46—display device, 47—alarm device;

5—waterproof cover, 52—sealing ring;

6—fastening components, 61—bolt, 62—fixed column,

7—fixing components.

PREFERRED EMBODIMENT OF THE INVENTION

The following, in conjunction with the accompanying drawings of the invention, provides a clear and complete description of the technical solutions in the embodiments of the invention. Obviously, the described embodiments are only part of the embodiments of the invention, not all of them. Based on the embodiments in the invention, all other embodiments obtained by those skilled in the art without creative effort fall within the scope of the invention.

As shown in FIGS. 1-7, the invention provides a metal detector, including a detection disc 1, a detection rod 2 rotationally connected to the detection disc 1, a detachable protective sleeve 3 inside the detection rod 2, and electronic components 4 housed within the protective sleeve 3. This embodiment achieves angle adjustment of the detection disc 1 through the rotational connection between the detection rod 2 and detection disc 1, adapting it to various operational conditions.

Electronic components 4 include a main circuit board 41 extending along the length direction of the protective sleeve 3 and a secondary circuit board 42 fixed perpendicularly to the main circuit board 41. The secondary circuit board 42 is positioned near the opening of the protective sleeve 3, and the main circuit board 41 includes control circuits and electronic components for the detector (such as display components, alarm components, etc.). The secondary circuit board 42 has a detection disc socket 43 facing the interior side of the detection rod 2. The detection disc 1 includes a coil 11, a waterproof cable 12 connected to the coil 11, and a detection disc plug 13 positioned at the end of the waterproof cable 12. The detection disc plug 13 and detection disc socket 43 are mutually matched, enabling rapid connection between the detection disc 1 and electronic components 4.

During installation, the waterproof cable 12 and detection disc plug 13 enter through the bottom hole of detection rod 2 and extend to its interior, until the detection disc plug 13 is plugged into the detection disc socket 43, achieving an electrical connection between the detection disc 1 and electronic components 4. This application does not limit the specific structure of the detection disc plug 13 and detection disc socket 43; for example, in some embodiments, the detection disc socket 43 may be a USB socket, and the detection disc plug 13 may be a USB plug, but not limited to this.

Figure 4:
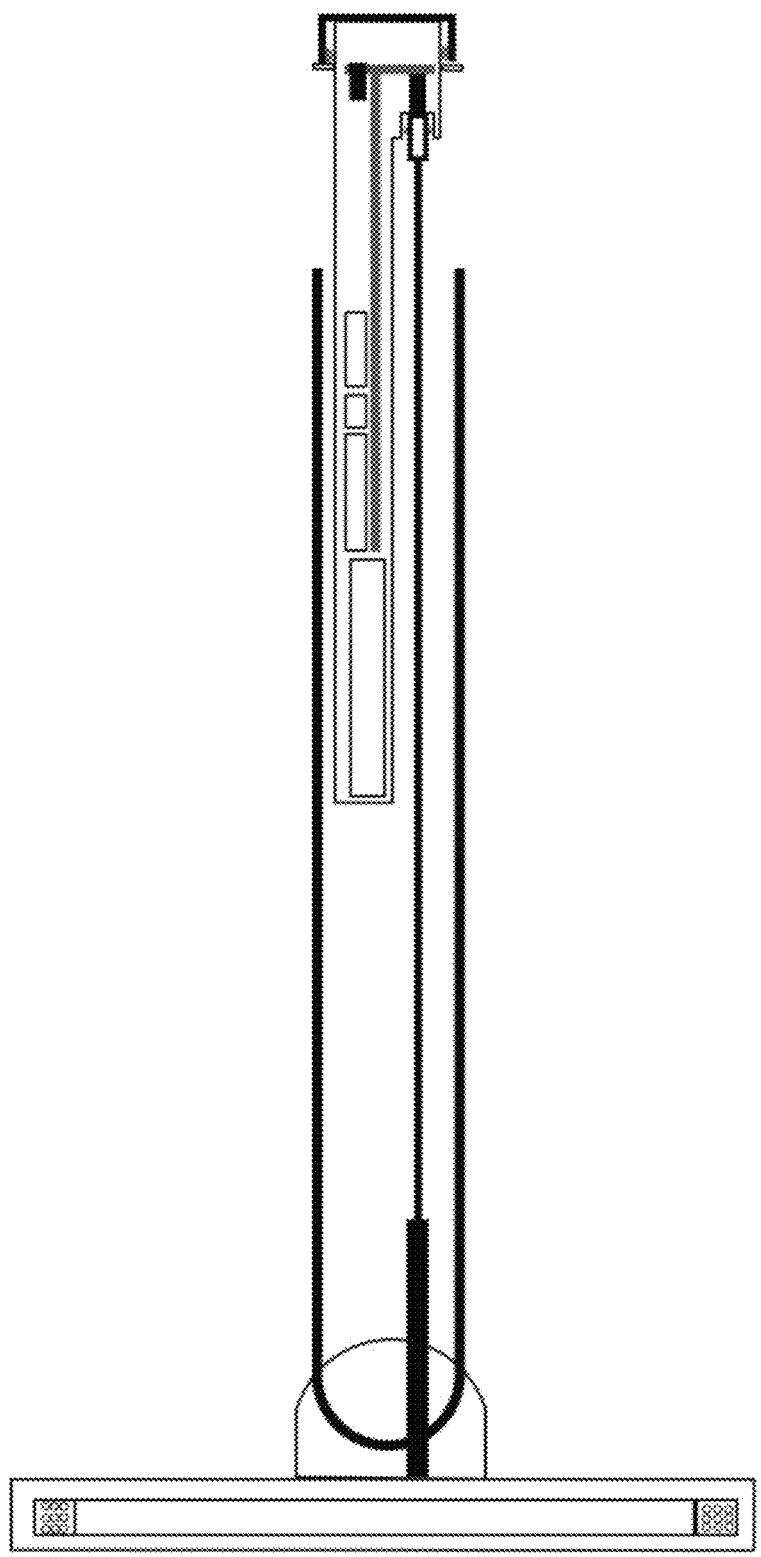
FIG. 4 shows a schematic diagram of the structure of the protective sleeve taken out from inside the detection rod.

As shown in FIG. 4, the waterproof cable 12 in this embodiment is slightly longer than the detection rod 2, facilitating the extension of the detection disc plug 13 out of the detection rod 2's end and connecting to the detection disc socket 43 inside the protective sleeve 3. To assemble the metal detector, first thread the waterproof cable 12 and detection disc plug 13 through the bottom hole of the detection rod 2, expose the detection disc plug 13 at the end of the detection rod 2, insert part of the protective sleeve 3 into the detection rod 2, then insert the detection disc plug 13 into the detection disc socket 43, and finally push the entire protective sleeve 3 into the detection rod 1. The position of the protective sleeve 3 is fixed by the mutual pressure fitting of the upper outer diameter of the protective sleeve 3 and the inner diameter of the detection rod 2. When a different size detection disc 1 is required, pull out the protective sleeve 3, unplug the detection disc plug 13, remove the detection disc 1 and waterproof cable 12 from the detection rod 2, thread the new detection disc's waterproof cable 12 through the bottom of the detection rod 2, connect to the detection disc socket 43 on the protective sleeve 3, and finally push the protective sleeve 3 into the detection rod 2.

This embodiment achieves the purpose of separately detaching and replacing the detection disc 1 by placing the electronic components 4 inside the protective sleeve 3, and through the connection method of the detection disc plug 13 and detection disc socket 43. The overall structure is compact and simple, facilitating installation and disassembly.

Figure 6:
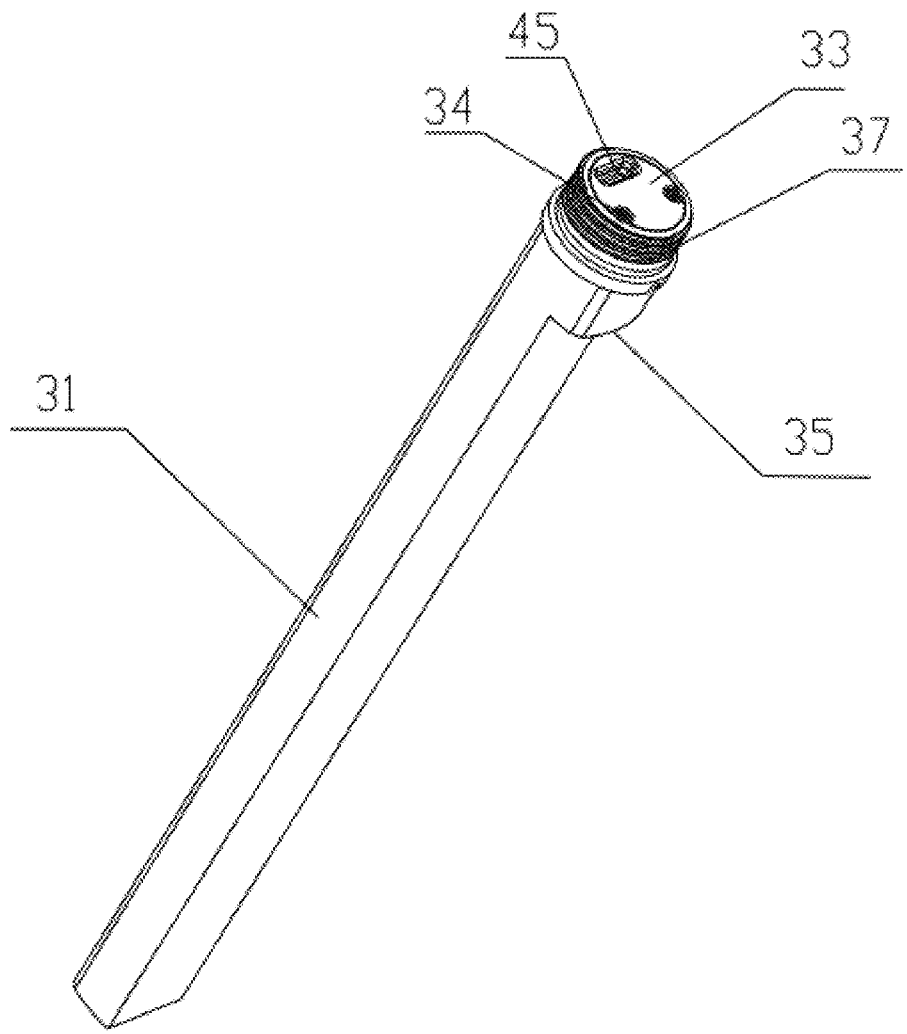
FIG. 6 shows an assembly structure diagram of the protective sleeve and electronic components of the metal detector of the invention.

Specifically, as shown in FIG. 6, electronic components 4 are detachably connected inside the protective sleeve 3 through an installation plate 33 located at the opening end of the protective sleeve 3. This detachable connection method facilitates later repairs to damaged electronic components 4. The upper outer diameter of the protective sleeve 3 is adapted to the inner diameter of the detection rod 2, facilitating the insertion of the protective sleeve 3 into the detection rod 2 and initially fixing it through a tight fit. This application does not limit which specific part of the upper outer diameter of the protective sleeve is adapted to the inner diameter of the detection rod 2; optionally, an annular protrusion is provided at the lower end of the first connecting part 37, and the outer diameter of the annular protrusion is the same as the inner diameter of the detection rod 2.

Figure 7:
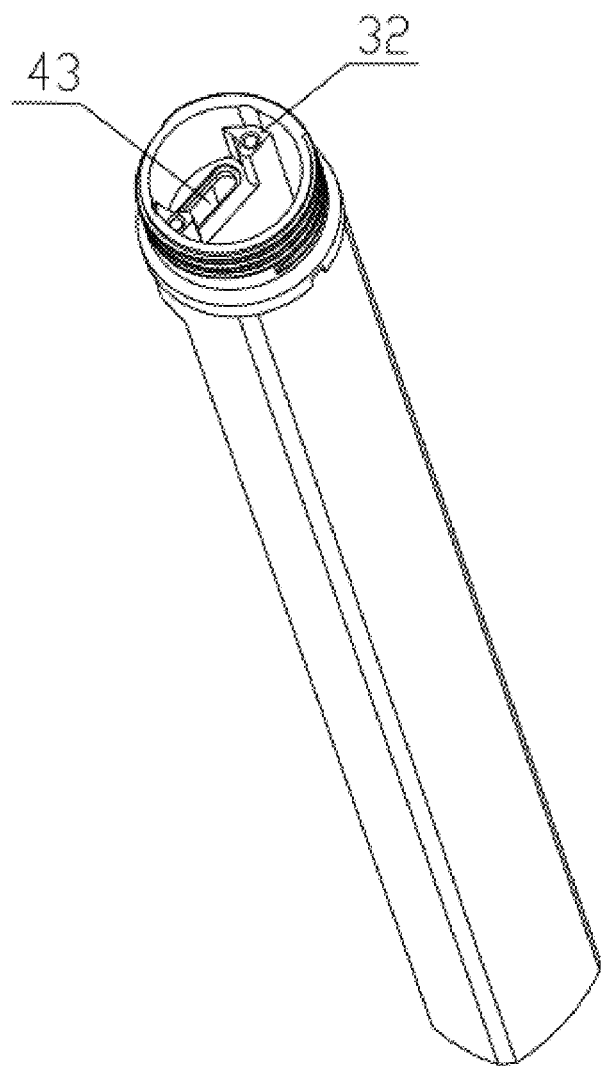
FIG. 7 shows a structural diagram of the protective sleeve of the metal detector.

Specifically, as shown in FIGS. 1 and 7, the protective sleeve 3 is integrally formed and includes a main housing cavity 31 and a positioning part 32 located on the opening side of the main housing cavity 31. Between the outer wall of the main housing cavity 31 and the inner wall of the detection rod 2, there is space to accommodate the waterproof cable 12 (i.e., the passage space for the waterproof cable), and the waterproof cable 12 passes through this space to plug into the detection disc socket 43 via the detection disc plug 13. The main circuit board 41 is inside the main housing cavity 31, and the secondary circuit board 42 abuts against the positioning part 32, being fixed between the positioning part 32 and the installation plate 33 by fasteners 34. Preferably, the fasteners 34 are bolts, and the positioning part 32 has bolt holes, while the installation plate 33 has through holes opposite the bolt holes. The fasteners 34 pass through the through holes and screw into the threaded holes in the positioning part 32, fixing the secondary circuit board 42 to the protective sleeve 3. When the main circuit board 41 and/or secondary circuit board 42 have problems, the installation plate 33 can be removed by loosening the fasteners 34, allowing for the removal of the integrally formed main circuit board 41 and secondary circuit board 42 for inspection and repair.

Figure 2:
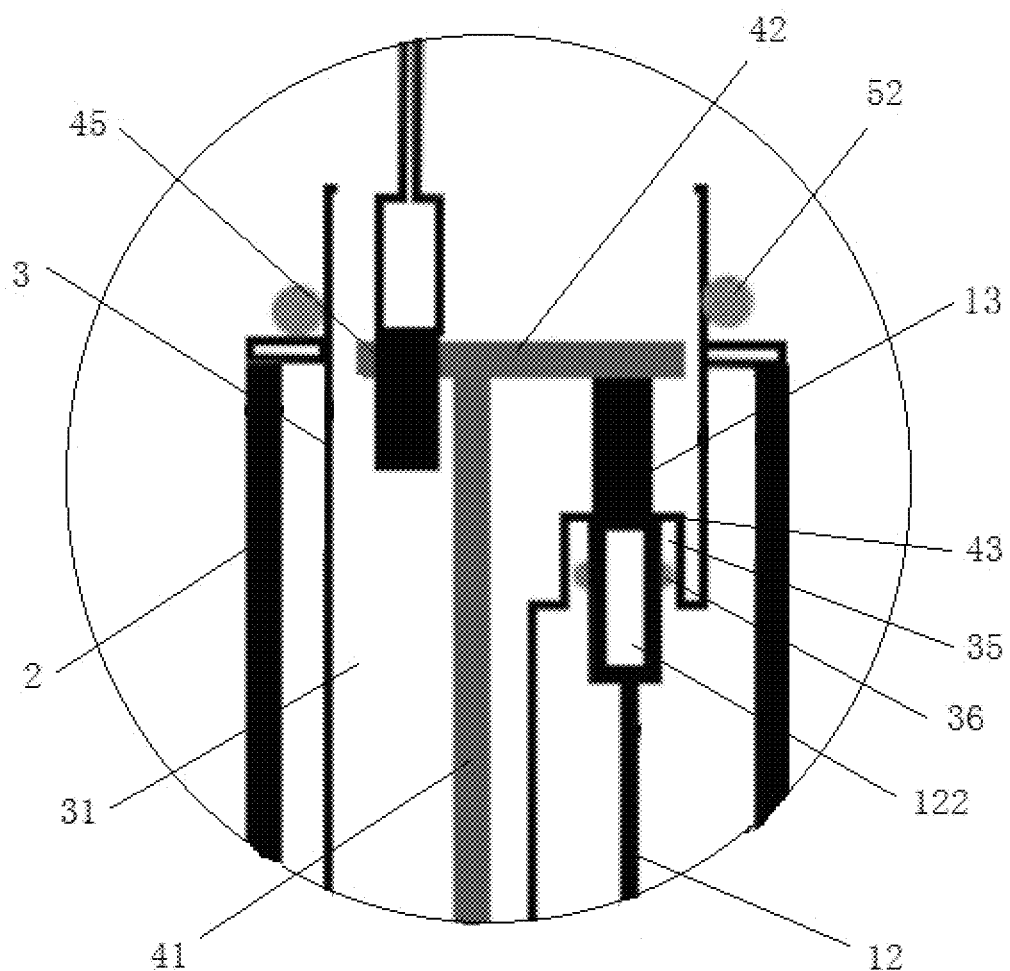
FIG. 2 shows an enlarged view of Part A of FIG. 1.

Specifically, as shown in FIGS. 2 and 6, the protective sleeve 3 also includes a waterproof mounting groove 35 located below the detection disc socket 43. The waterproof mounting groove 35 is located within the space between the main housing cavity 31 and the detection rod 2, and the detection disc plug 13 connects the waterproof cable 12 via the waterproof mounting part 122, which matches the inner diameter of the waterproof mounting groove 35. A waterproof sealing ring 36 is provided between the waterproof mounting groove 35 and the waterproof mounting part 122. During installation, the detection disc plug 12 is successively inserted into the detection disc socket 43 through the space between the main housing cavity 31 and the detection rod 2, the waterproof mounting groove 35, and the detection disc socket 43. Simultaneously, the waterproof mounting part 122 is precisely located within the waterproof mounting groove 35 and sealed by the waterproof sealing ring 36. Waterproof mounting groove 35 provides waterproof conditions for t the detection disc plug 13 to prevent water vapor from entering the protective sleeve 3 through the detection disc plug 13.

Figure 5:
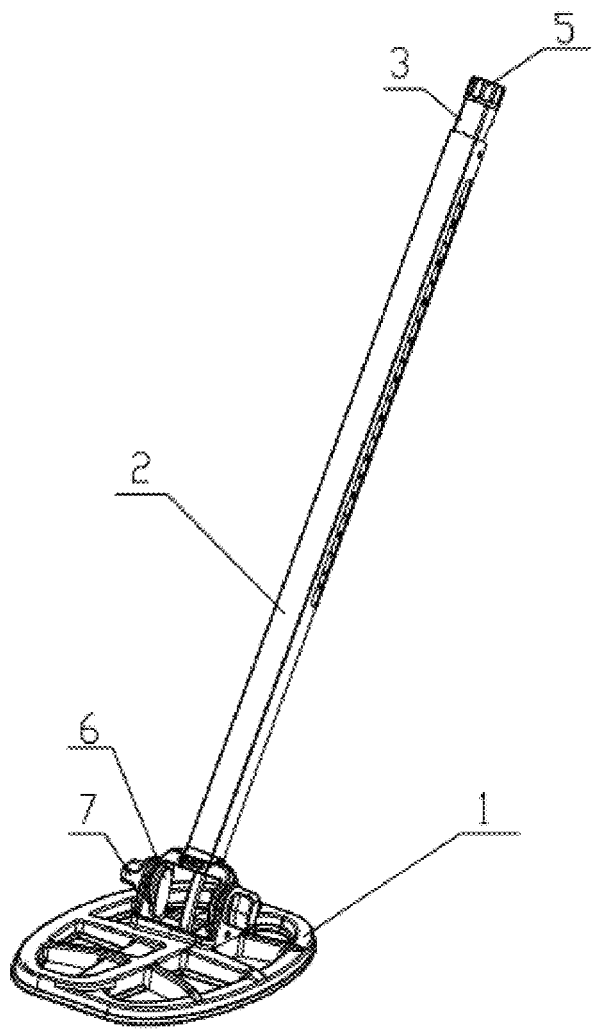
FIG. 5 shows a three-dimensional model structure diagram of the metal detector.

Specifically, as shown in FIGS. 1 and 5, the opening end of the protective sleeve 3 is also sealed with a waterproof cover 5. The opening end of the protective sleeve 3 has a first connection part 37, and the waterproof cover 5 has a second connection part (not shown in the figure). The first connection part 37 and the second connection part are sealed together with a waterproof ring 52. The first connection part and the second connection part can vary; for example, they could be external threads on the protective sleeve and internal threads in the waterproof cover, sealed together by screwing them in place.

As shown in FIG. 1, the electronic components 4 also include a battery 44 electrically connected to the main circuit board 41. The main circuit board 41 has a power socket 45 fixed to the side opposite to the secondary circuit board 42, which penetrates the installation board 33 and faces outward. Optionally, the power socket 43 can be a USB socket, a magnetic charging head, or a DC head. To charge, remove the waterproof cover 5 on the protective sleeve 3 and plug in the charger. After charging, tighten the waterproof cover 5.

Specifically, as shown in FIG. 2, the electronic components 4 also include a display device 46 and/or an alarm device 47 connected to the main circuit board 41. The display device 46 may include but is not limited to an antenna, a processor, etc., while the alarm device 47 may include but is not limited to a vibration motor, a buzzer, switches, acceleration sensors, etc.

Inside the protective sleeve 3, the main circuit board also has a magnetic induction switch, such as a Hall switch. The device will power on when a magnet of certain magnetism passes through the induction range of the magnetic switch. Alternatively, external button switches could control the power, which falls under the protection scope of the invention.

As shown in FIG. 1, the part of the waterproof cable 12 near the detection disc 1 is a thickened cable 121; part of the thickened cable 121 extends into the detection rod 2, and part is located outside. The thickened cable 121 prevents wear on the waterproof cable 12 from the detection rod 2 during rotation and can also push the cable into the detection rod 2.

Figure 3:
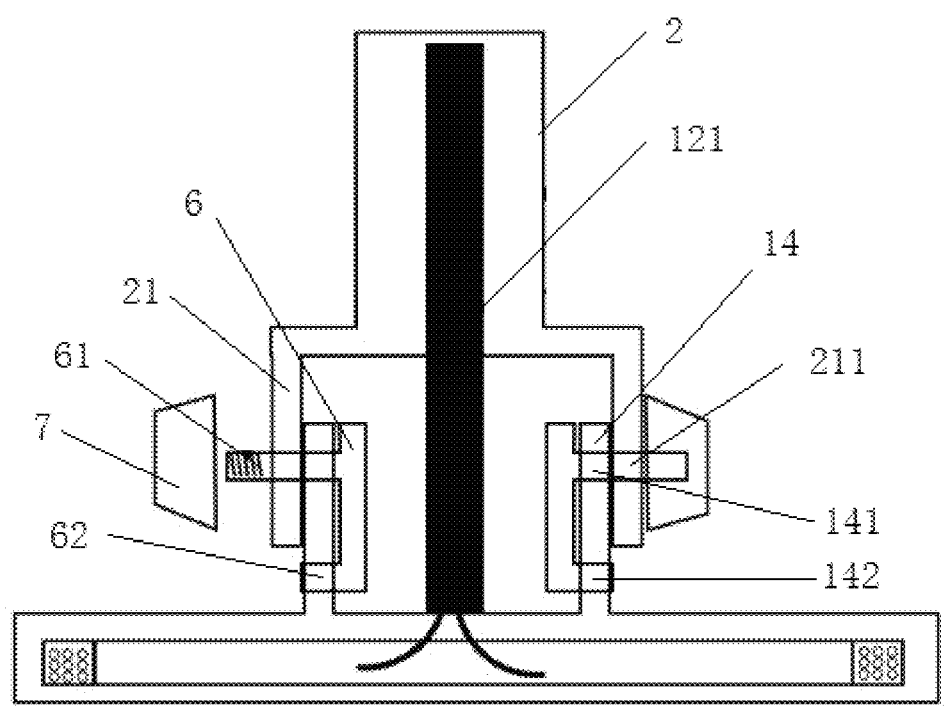
FIG. 3 shows a schematic diagram of the connection structure of the detection disc and detection rod of the metal detector.

Specifically, as shown in FIGS. 3 and 5, the detection disc 1 and the detection rod 2 are connected by fastening components 6 and fixing components 7. The detection disc 1 has two opposing first bracket 14 on both sides. Each first bracket 14 has a first through hole 141 and a third through holes 142, located below the first through hole 141. The bottom sides of the detection rod 2 have two opposing second bracket 21. Each second bracket has a second through hole 211, corresponding to the first through holes 141. Fastening components 6 have a bolt 61 and a fixing column 62. Bolt 61 go through the second through hole 211 and first through hole 141 from the inside to the outside of the second support 21 and is connected with fixing components 7. The fixing column 62 passes through the third through hole 142 from the inside to the outside, and the detection rod 2 rotates with the bolt 61 as the rotation axis; Preferably, the bolt 61 is equipped with external threads, and the fixing components 7 is equipped with internal thread, and the fixing components 7 is bolted to the bolt 61. The detection disk 1 and detection rod 2 are fixed in the designated position by rotating the fixing components 7; When it is necessary to adjust the angle between the detection rod 2 and the detection disc 1, loosen the fixing components 7 to rotate the detection rod 2 around the bolt 61 at a certain angle, and then tighten the fixing components 7.

It should be noted that the internal coil of the detection disc 1 in the invention, like those in conventional metal detectors, has both transmitting and receiving coils. The shape of the coil is not limited to double-D, circular, or elliptical shapes.

The above has further described the invention with the help of specific embodiments, but it should be understood that the specific description here should not be understood as limiting the essence and scope of the invention. Various modifications made by ordinary technical personnel in the art to the above embodiments after reading this manual belong to the scope protected by the invention.

The invention claimed is:
1. A metal detector, comprising:
a detection disc;
a detection rod rotationally connected to the detection disc;
a protective sleeve detachably connected inside the detection rod; and
electronic components set within the protective sleeve;
wherein the electronic components include a main circuit board extending along a length direction of the protective sleeve and a secondary circuit board perpendicular to the main circuit board, with the secondary circuit board located near an opening end of the protective sleeve;
the secondary circuit board has a detection disc socket facing an interior side of the detection rod;
the detection disc includes a coil, a waterproof cable connected to the coil, and a detection disc plug located at a first end of the waterproof cable; the waterproof cable and the detection disc plug extend into the detection rod, allowing the detection disc plug to plug into the detection disc socket.

2. The metal detector according to claim 1, wherein the electronic components are detachably connected inside the protective sleeve via an installation plate located at the opening end of the protective sleeve; the protective sleeve is plugged into the detection rod.

3. The metal detector according to claim 2, wherein the protective sleeve includes a main housing cavity and a positioning block located on the opening side of the main housing cavity, the main circuit board is located inside the main housing cavity, and the secondary circuit board abuts against the positioning block and is fixed between the positioning block and the installation plate by fasteners.

4. The metal detector according to claim 1, wherein the opening end of the protective sleeve is sealed with a waterproof cover, a first connection part is arranged at the opening end of the protective sleeve, and a second connection part is arranged on the waterproof cover, and the first connecting part and the second connecting part are hermetically connected through a waterproof ring.

5. The metal detector according to claim 2, wherein the electronic components comprise a battery electrically connected to the main circuit board, a power socket is fixed on the secondary circuit board, and the power socket penetrates the installation plate and is partially exposed outside the installation plate.

6. The metal detector according to claim 1, wherein the electronic components include a display device and/or an alarm device electrically connected to the main circuit board.

7. The metal detector according to claim 1, wherein a second end of the waterproof cable is a thickened cable; the second end of the waterproof cable is opposite to the first end of the waterproof cable, a first part of the thickened cable extends into the detection rod, and a second part of the thickened cable is located outside the detection rod.

8. The metal detector according to claim 1, wherein the detection disc and detection rod are connected by fastening components and fixing components,
first brackets are fixedly disposed on the detection disc, the first brackets comprise first through holes, second brackets are fixedly disposed on the detection rod, the second brackets comprise second through holes, and the first through holes are one-to-one corresponding to the second through holes;
the first brackets further comprise third through holes, each of the third through holes is located below a corresponding one of the first through holes; and
the fastening components comprise bolts and fixed columns; each of the bolts passes through a corresponding one of the second through holes and a corresponding one of the first through holes in sequence and is connected to a corresponding one of the fixing components, and each of the fixed columns passes through a corresponding one of the third through holes.

9. The metal detector according to claim 8, wherein the bolts have external threads, and the fixing components have internal threads, and the fixing components are respectively screwed with the bolts, so as to fix a position of the detection disc relative to a position of the detection rod.

* * * * *